Figure 5:
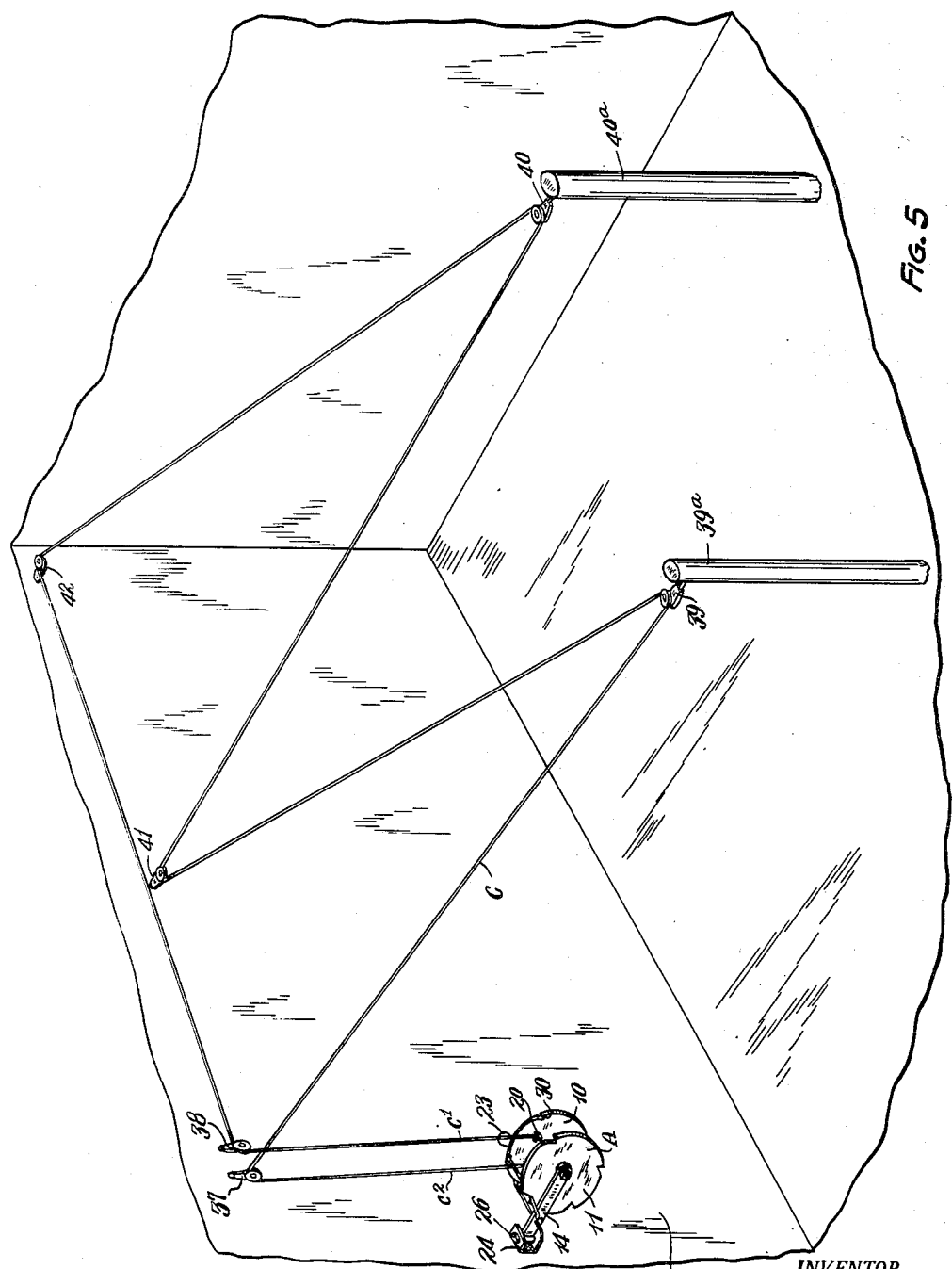

May 1, 1951 — C. McCAMPBELL — 2,551,149
REEL
Filed Feb. 21, 1946 — 2 Sheets-Sheet 1
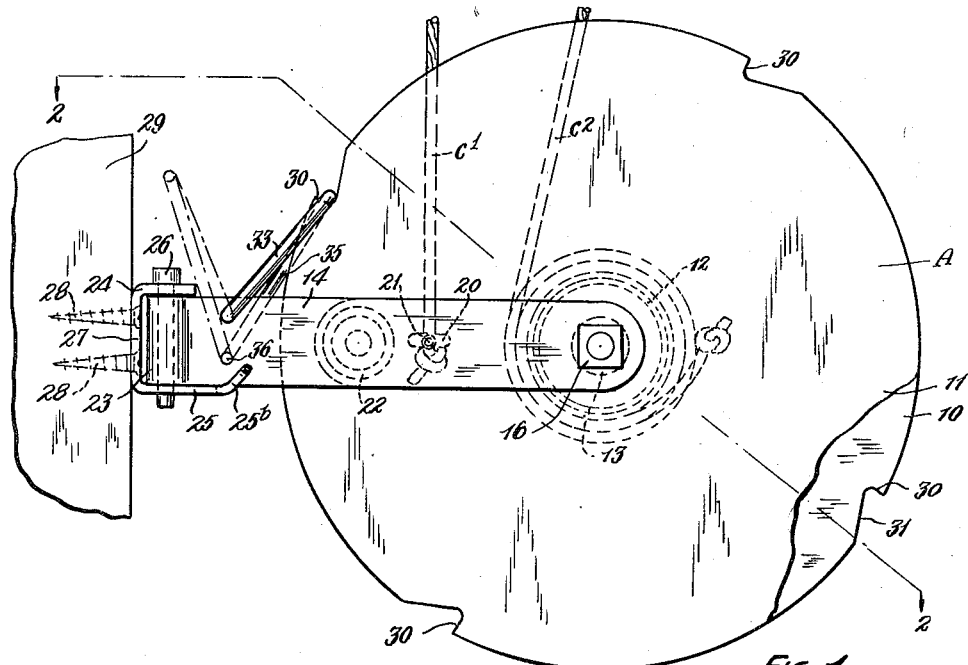
FIG. 1
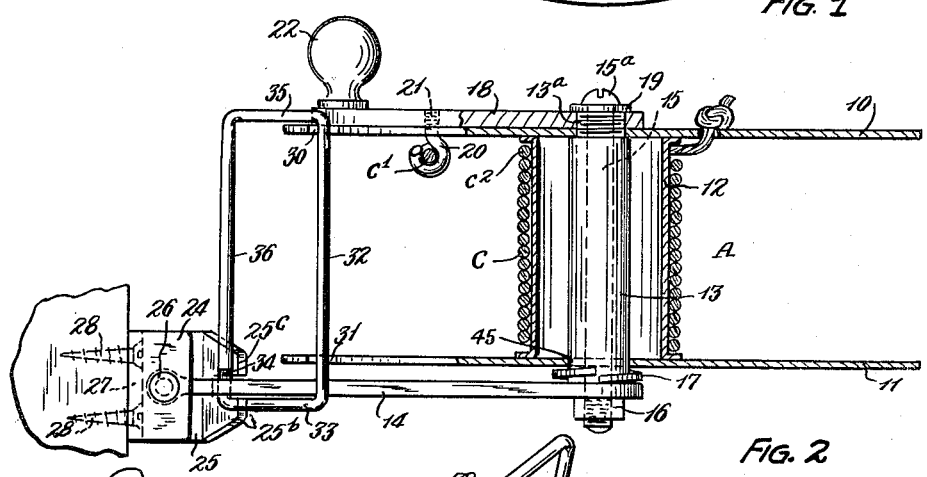
FIG. 2
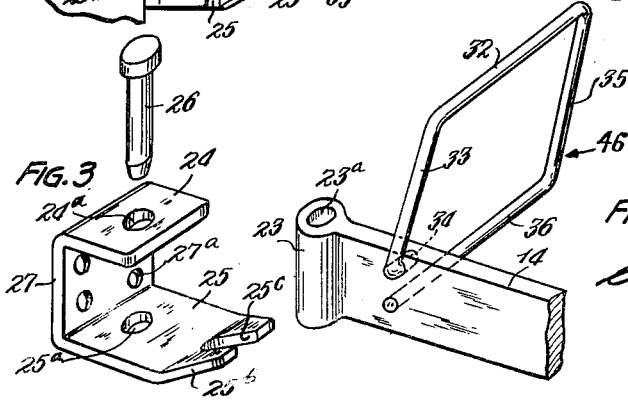
FIG. 3
FIG. 4
INVENTOR.
Clarence McCampbell.
BY
Hull & West.
ATTORNEYS May 1, 1951 C. McCAMPBELL 2,551,149
REEL
Filed Feb. 21, 1946 2 Sheets-Sheet 2

INVENTOR.
Clarence McCampbell
BY
Hull & West
ATTORNEYS

Patented May 1, 1951

2,551,149

UNITED STATES PATENT OFFICE 2,551,149

REEL

Clarence McCampbell, Cleveland, Ohio

Application February 21, 1946, Serial No. 649,171

3 Claims. (Cl. 242—100)

This invention relates to means for winding and for supporting pliable lines, such as clotheslines, said means including a construction of reel possessing features of novelty whereby the operation of adjusting the tension of a line when applied to external supporting means may be facilitated and whereby the combination of said reel and the external supporting means will enable only that portion of a clothesline which has not been utilized for the hanging of clothes to drag upon the ground as the line is drawn in by the rotation of the reel in the appropriate direction.

The means whereby I accomplish the foregoing general objects are illustrated in the drawing forming part hereof wherein Fig. 1 represents a side elevational view of the reel showing the manner in which it is detachably connected to a fixed support and the manner in which a clothesline is secured thereto; Fig. 2 is a sectional view corresponding approximately to the line 2—2 of Fig. 1, the central axle sleeve being shown in elevation; Fig. 3 a detail in perspective of the bracket and pin by means of which the reel is detachably secured to a fixed support; Fig. 4 a detail in perspective of the end of the supporting arm which cooperates with the bracket shown in Fig. 3 and of the detent loop which cooperates with projections on the sides of the reel to retain the latter in the position which it assumes when the line has been tightened after having been rove about its supporting members; and Fig. 5 a view in perspective representing the manner in which a clothesline may be supported conjointly by my reel and by pulleys arranged in zig-zag relation in such manner as will enable the clothesline to be wound upon the reel without contact of the hanging portions thereof with the ground.

Describing by reference characters the various parts shown in the drawings, and first with reference to Figs. 1-4 inclusive, A denotes the reel as a whole, the same comprising side members shown as circular plates or flanges 10 and 11 connected to opposite sides of a cylindrical hub 12. 13 denotes a sleeve located centrally of the hub 12 and extending through an opening 45 in the side plate 11 and the outer end of which abuts against one end of the supporting arm 14. 15 denotes an axle, in the form of a bolt which extends centrally through the sleeve 13 and through an aperture provided therefor in the arm 14 and is provided with a nut 16 on the outer end thereof. A spring washer 17, inserted between the inner face of the arm 14 and the adjacent outer surface of the plate 11, exerts a dragging or braking action against the side plate 11 thereby to prevent the reel from unwinding more rapidly than is desirable while the line is being unwound from the spool thereof.

The opposite end of the sleeve 13 is reduced and threaded, as shown at 13ª, the reduced end extending through the side plate 10 and having threaded thereupon the inner end of an arm 18, a washer 19 being interposed between the outer end of the said reduced portion and the head 15ª of the axle 15.

20 denotes an anchoring member, shown as a hook located within the side plate 10 and extending through a hole in the same and being threaded into the side plate 10. The hook is spaced radially a considerable distance from the spool 12 whereby a considerable portion of the clothesline C, when wound upon the spool, will be interposed between the latter and the hook. The arm 18 is provided with a handle 22 which serves as a means for rotating the reel for the purpose of winding the line thereupon. The arm, being connected to the side plate 10 by the shank of the hook 20, serves to stiffen the portion of this side plate to which the handle is connected thereby enabling me to employ light gauge metal for the said side plate.

The supporting arm 14 is provided at its outer end with a sleeve 23 which is adapted to be received between the top and bottom flanges 24 and 25 of a channel bracket, the said flanges being provided with openings 24ª and 25ª with which the top and bottom of the bore 23ª of the sleeve is adapted to register and through which openings and bore a pin 26 is adapted to be inserted. The web 27 of the bracket is provided with openings 27ª for the reception of screws 28 whereby the bracket may be secured to a support 29. The bottom flange 25 of the bracket is longer than the top flange and its outer end is deflected upwardly, as shown at 25ᵇ, and this deflected portion is provided with a centrally located slot 25ᶜ for the reception of the adjacent lower portion of the arm 14, whereby the said arm is held against rotary movement about the pin 26.

The supporting arm 14 is provided with a detent 46 which is adapted to engage projections 30 on the side plates 10 and 11, the said projections being formed as the outwardly extending walls of notches 31 extending inwardly from the external edges of the said plates. The projections and notches on the said plates are symmetrically arranged; that is to say, each projection on each of the side plates is in the same radial plane as a corresponding projection on the other side plate.

Cooperating with these notches and projections is a detent which is carried by the supporting arm 14 and is preferably in the form of a loop having an outer arm or reach 32 extending transversely of the plates 10 and 11 and supported from the arm 14 by means of an integral arm 33 extending downwardly from one end of the outer arm or reach and pivotally supported at its lower end by a journal lug 34 bent therefrom and extending through a suitable bearing opening provided therefor in the arm 14. The opposite end of the outer arm or reach 32 is supported by an integral arm 35 which extends downwardly therefrom and which is connected at its lower end to an arm or reach 36, shown as extending parallel to the arm or reach 32 and having its end journaled in the arm 14. This manner of mounting the detent loop enables the latter to be flipped away from the reel and toward the support 29, as shown in broken lines in Fig. 1, and to remain in such position while the line is being unwound from the reel; also be flipped in the reverse direction whereby the arm or reach 32 will be so positioned as to engage the projections 30, and will remain in such position while the reel is being operated by the handle 23 in order to wind a clothesline thereupon.

In Fig. 5 I have shown the manner in which the reel may be operated in connection with a plurality of supporting members arranged in zig-zag relation to one another. In this view, 37 and 38 denote supporting members, shown as open-sided pulleys, which are shown as secured to a support, such as 29, and which are also shown as having their axes extending substantially horizontally when in use. 39 and 40 designate other supporting members, also shown as open-sided pulleys, secured to posts 39ª and 40ª and which are shown as having their axes in substantially vertical planes when in use. 41 and 42 denote open-sided pulleys which are secured to a support such as 29 and which are shown as having their axes arranged in substantially vertical planes when in use.

In operation, the detent is swung to the broken-line position shown in Fig. 1. The outer end of the clothesline is then unwound from the hub 12 and rove around the pulleys 37, 39, 41, 40, 42 and 38 and is then detachably secured to the anchoring hook 20. The operator then flips the detent to the full-line position shown in Figs. 1, 2 and 5 and winds in the slack of the clothesline by means of the handle 23. The inner end C' of the clothesline C, being secured operatively to the hub 12 through the side plate 10 and the outer end C² being fastened to the hook 20, the winding of the reel operates to take up the bight of the line between its point of attachment to the reel, thereby tightening the clothesline in both directions from its central support upon and by the reel.

When it is desired to wind in the clothesline following its use, the outer end is detached from the hook 20, the detent is flipped to the broken-line position shown in Fig. 1 and the reel rotated in the appropriate direction by the handle 23. It will be noted that, prior to detaching the outer or free end of the line from the hook 20, there is a considerable stretch of line interposed between the said hook and the pulley 42, which stretch is supported above the ground. In winding the line in after the outer end of the same has been cast off from the hook, this stretch of the line, which is not used for the hanging of clothes, acts as a drag to prevent any part of the used portion of the line from sagging to such an extent as to contact the ground.

When it is desired to carry the reel during or after the operations of unwinding and winding the line, it can be quickly and conveniently removed from the bracket attached to the support 29, being supported by the arm 14, when thus removed, while the reel is rotated by the handle 23, after which it can be quickly and conveniently secured to said bracket.

Having thus described my invention, what I claim is:

1. A device of the character set forth comprising a reel including a hub on which a line can be wound and to which the inner end of said line can be secured and side members connected to opposite ends thereof, an axle extending centrally through said hub and the side members, an anchoring member by which the opposite end of said line may be detachably supported and which is secured to one of said side members and which extends into the space between the said side members and which is spaced radially outwardly from said hub, and means for rotating said reel.

2. A device of the character set forth comprising a spool having a hub on which a line can be wound and to which the inner end of a line can be secured and side members connected to opposite ends thereof, an axle extending centrally through said spool and the side members, a handle connected to one of said side members, an anchoring member by which the opposite end of said line may be detachably supported and which is secured to one of said side members and which extends into the space between the said side members and is spaced radially outwardly from said hub, said anchoring member being exposed even when an appreciable number of layers of line are wound upon said hub, a supporting arm through which extends the end of said axle which is opposite to the side member to which the handle is connected and in which arm the said end of the axle is journaled, and a detent carried by said supporting arm and adapted to engage ratchet projections provided therefor on one of said side members.

3. A device of the character set forth comprising a spool having a hub with side members connected to opposite ends thereof, an axle extending centrally through said spool, a supporting arm for said axle and forming a bearing therefor, means for winding said spool, and means for detachably connecting the outer end of the supporting arm to a base, said means comprising a bracket having upper and lower substantially horizontal flanges connected by a vertical web, the said flanges having opposed aligned openings and the supporting arm having a sleeve adapted to be received between said flanges, and a pin adapted to be inserted into the said sleeve and openings, one of said flanges normally being below the other of said flanges and having projections adapted to engage opposite sides of the adjacent portion of the supporting arm for locking same in a given position.

CLARENCE McCAMPBELL.

REFERENCES CITED

The following references are of record in the file of this patent:

UNITED STATES PATENTS

| Number | Name | Date |
|---|---|---|
| 470,674 | Hoffmeister | Mar. 15, 1892 |
| 671,225 | Nycum | Apr. 2, 1901 |
| 687,942 | Sanders | Dec. 3, 1901 |
| 778,045 | Kirkbridge | Dec. 20, 1904 |
| 845,702 | Muse | Feb. 26, 1907 |
| 1,024,978 | Eiche | Apr. 30, 1912 |
| 1,032,395 | Foss | July 16, 1912 |
| 1,082,637 | Julien | Dec. 7, 1913 |
| 1,140,787 | Baeumle | May 25, 1915 |
| 1,323,771 | Johnson | Dec. 2, 1919 |
| 1,512,188 | Anderson | Oct. 21, 1924 |
| 1,650,364 | Knitter | Nov. 22, 1927 |
| 1,892,276 | Johnson | Dec. 27, 1932 |